Figure 1:
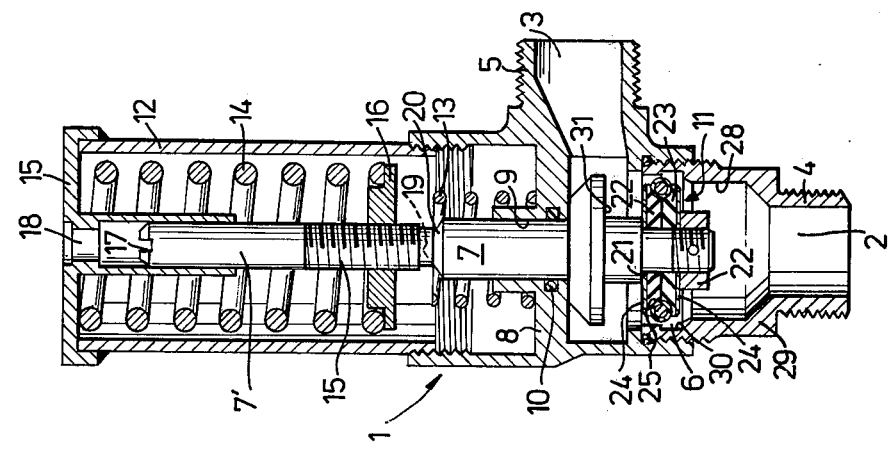

United States Patent [19]

Berg

[11] 4,064,906
[45] Dec. 27, 1977

[54] VALVE FOR WATER PIPES

[76] Inventor: Lennart Gustaf Berg, Fylgiavagen 1, S-182 64 Djursholm, Sweden

[21] Appl. No.: 497,271

[22] Filed: Aug. 14, 1974

[30] Foreign Application Priority Data

Aug. 28, 1973 Sweden .................................. 7311664

[51] Int. Cl.² .............................................. F16K 15/00
[52] U.S. Cl. .................................... 137/529; 137/538; 137/469
[58] Field of Search ............ 137/469, 494, 511, 625.5, 137/529, 538, 540, 542; 251/DIG. 1, 337; 277/229

[56] References Cited

U.S. PATENT DOCUMENTS

| 455,853 | 7/1891 | Shepard | 137/529 |
|---|---|---|---|
| 1,879,413 | 9/1932 | Muller | 251/337 X |
| 1,962,549 | 6/1934 | Bjorklund | 137/538 X |
| 2,110,481 | 3/1938 | Crocker | 137/469 |
| 2,280,937 | 4/1942 | Thornhill et al. | 137/469 |
| 2,745,626 | 5/1956 | Wilson | 251/337 X |
| 2,752,940 | 7/1956 | Gentzel | 137/469 |
| 2,891,568 | 6/1959 | Gaffney | 251/337 X |
| 2,984,254 | 5/1961 | Allen | 137/467 |
| 2,997,097 | 8/1961 | Merkel | 277/229 X |
| 3,013,577 | 12/1961 | Hildre | 137/469 |
| 3,112,933 | 12/1963 | Merkel | 277/229 |
| 3,183,933 | 5/1965 | Whitlock et al. | 137/625.5 X |
| 3,446,239 | 5/1969 | Klenz | 137/469 |

Primary Examiner—Harold W. Weakley
Attorney, Agent, or Firm—Hill, Gross, Simpson, Van Santen, Steadman, Chiara & Simpson

[57] ABSTRACT

A valve for water pipes comprises a housing with an inlet opening and an outlet opening with a through-flow chamber arranged between both these openings, in which a spring loaded valve spindle provided with a sealing means is arranged to work in a direction to and from an engagement surface intended for the valve spindle sealing means in the chamber, for regulating the flow through the chamber in a direction from the one opening to the other. It is characterized in that at least a part of the through-flow chamber has a cylindrical wall surface forming the engagement surface for the valve spindle sealing means, that this means has the shape of a piston traversing this wall surface, a sealing element for example in the form of a sealing ring, being mounted round the piston, and filling an intermediate space between the piston and the cylindrical wall surface, and that the valve spindle is biassed by at least two coacting springs of which the one is unloaded as the loading increases on the other, during the axial movement of the spindle caused by pressure variations in the water pipe.

3 Claims, 3 Drawing Figures

VALVE FOR WATER PIPES

BACKGROUND OF THE INVENTION

1. Field of the Invention
This invention relates to pressure relief means.

2. Prior Art
There are known valves for water pipes, essentially consisting of a housing with an inlet opening and an outlet opening, between these both openings there being arranged a through-flow chamber in which there is a spring biassed valve spindle provided with sealing means, arranged to move in a direction from and to an engagement surface for the valve spindle means arranged in the chamber, for regulating the flow through the chamber in a direction from the one opening to the other.

In these known valves, the sealing means carried by the valve spindle has had the form of a flat plate provided with a valve washer which has coacted with a valve seat in the form of a flat annular engaging surface inside the through-flow chamber in the valve housing. This design of valve has however caused the valve plate washer to have a propensity for binding onto the valve seat. This constitutes a very troublesome disadvantage with these valves, which have usually been used as safety valves in the supply pipes for fresh water to hot water supply tanks, where this binding tendency can adv affect the safety of the installation in a serious manner.

In order to obviate this disadvantage it is also known to provide valves of the type described in the introduction with a so-called easing mechanism. This has taken the form of a lever, pivotally mounted in the valve housing and in engagement with the valve spindle. The spring loaded valve plate has been able to be opened from its normally closed position by the aid of this lever so that the valve plate has been eased from its seating. In spite of the users of such valves being recommended to carry out easing movements monthly, the problem of valve plates stuck to the seat, with the valve washers spoiled in consequence, has generally remained, since most of the users of such valves either forget or do not bother to carry out the recommended measure regularly.

SUMMARY OF THE INVENTION

The present invention has the object of proposing a new valve of the type discussed in the introduction, which dispenses with the disadvantage associated with the known valves mentioned here.

A valve for water pipes which has been found to fulfil this object is, according to the invention, primarily characterized in that at least part of its through-flow chamber has a cylindrical wall surface forming the engagement surface for the valve spindle sealing means, that this means has the shape of a piston traversing this wall surface, a sealing element in the form of a sealing ring for example, being mounted around the piston and filling an intermediate space between the piston and the cylindrical wall surface, and that the valve spindle is biassed by at least two coacting springs, of which the one is unloaded as the loading increases on the other during the axial movement of the spindle caused by pressure variations in the water pipe.

Through the construction according to the invention of the sealing means and its engagement surface, a radial seal is obtained in contradistinction to the axial seal to be found on the previously known valves. This radial seal, in conjunction with biassing the valve spindle with at least two coacting springs suitably having different spring characteristics, allows the valve spindle with its associated piston-like sealing means to be movable in relation to the engagement surface even at comparatively small water pressure variations, without opening the valve for that reason. The sealing means or piston in a valve according to the invention can thereby be more nearly regarded as floating, but still in the closed position of the valve under normal working conditions, while the floating movements cause the valve sealing element to keep in movement against the engagement surface, and not to seize or stick against it, thus being kept in good condition so that the function of the valve is not disturbed when it is opened by greater pressures than those intended in the water pipes.

Due to both the springs, damping of possible vibration movements in the valve is also ensured.

A valve according to the invention has the big advantage that it can be made in several different ways. For example, the through-flow chamber in the housing can be provided with at least one portion with a cross sectional area greater than the cross sectional area enclosed by the cylindrical wall surface. The piston-like sealing means carried by the valve spindle will then be displaceable past the cylindrical wall surface and at least over a substantial portion of the housing portion with the larger cross sectional area. This construction has the advantage that a much greater throughflow area is obtained as soon as the sealing means or piston has left the cylindrical wall surface and come into the portion of the through-flow chamber having the larger cross sectional area. This is of specially large importance when the valve is used as a safety valve, and too high a pressure in the water pipe must be reduced in the quickest manner. A further advantage with this construction is that it is easy to manufacture and is not costly to make.

A valve having especially simple, very reliable and extensive setting possibilities in relation to different working pressures is obtained if the coacting springs are mounted end-to-end with a supporting element therebetween. To obtain settings in relation to different valve working pressures, the element is displaceable in relation to a portion of the valve spindle which is rotatable in relation to the portion of the spindle carrying the piston.

The sealing element around the piston carried by the valve spindle can either be an O-ring or also a rigid annular supporting means, for example a smooth metal ring with a resilient casing of rubber glidingly mounted around it.

The invention will now be more closely described in the following while referring to the attached drawing, which illustrates by way of example a preferred embodiment of the invention.

ON THE DRAWINGS

Figure 2:
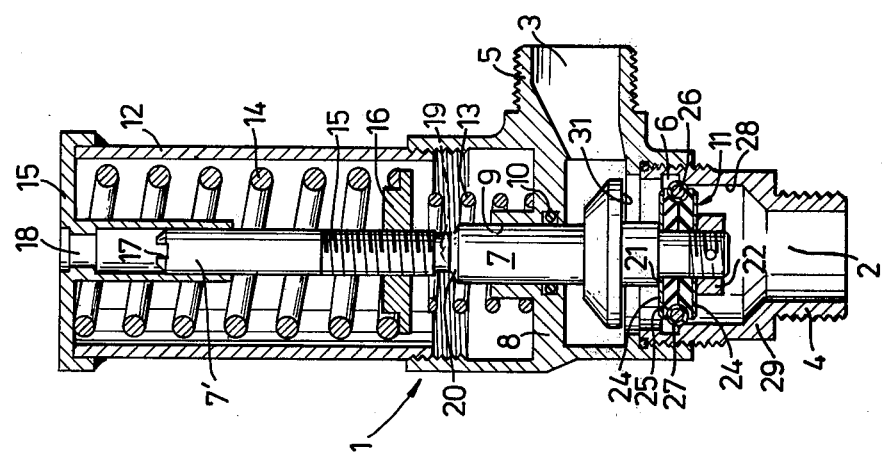
Figure 3:
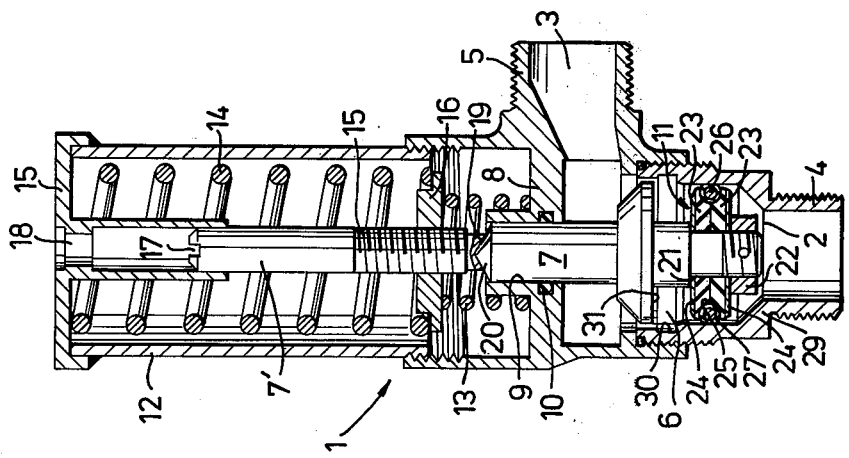

FIG. 1 on the drawing shows an axial section through an embodiment of the valve according to the invention, in its closed position, while FIGS. 2 and 3 show the same section through the valve in its opening and fully opened position, respectively.

AS SHOWN ON THE DRAWINGS

As shown in FIG. 1, a valve according to the invention has a housing 1, which has a generally cylindrical shape and is provided with an inlet opening 2 and an outlet opening 3 having associated connection fittings 4 and 5, respectively, which in the illustrated embodiment are arranged axially and radially, respectively, on the housing 1 with a through-flow chamber 6 inside the housing between them.

In this illustrated embodiment there is a valve spindle portion 7 in the housing 1 arranged to run guidedly in a guide 9 arranged in an intermediate wall 8 in the housing, the spindle being sealed against the bore of the guide by an O-ring 10 mounted in an annular groove in the bore. In its entirety, the valve spindle comprises two portions, the lower portion 7 carrying a sealing means in the form of a piston 11 and the upper portion 7' which is mounted and guided inside an upper portion 12 in the housing where it is surrounded and biassed by two coacting springs 13, 14 placed end-to-end with a supporting element between them in the shape of an annular plate 16 rotatable on a thread 15 on the upper spindle portion 7'. The opposite ends of the springs 13, 14 engage with the intermediate wall 8 in the housing 1 and a cover 15 attached to the housing portion 12, respectively.

Both the spindle portions 7, 7' are rotatable in relation to each other, and the upper portion 7' is provided with a screwdriver slot 17, accessable through a hole 18 in the cover 15 for setting the required working pressure of the valve. This hole may be sealed-off as a precaution against tampering. For engagement with the lower spindle portion 7, the upper spindle portion 7' has a conical recess 19 in its lower end surface, fitting a conical apex 20 on the upper end of the lower spindle portion 7.

Due to the way in which both the springs 13 and 14 are arranged around the valve spindle, essentially inside the upper portion 12 of the housing 1, the one will be unloaded as the load on the other increases during the axial movement of the spindle.

The piston-like sealing means 11 of the valve is mounted between a shoulder 21 on the lower spindle portion 7 and a locking nut 22 threaded on to the lower end thereof. The sealing means can be made in a variety of ways, but in this illustrated embodiment it comprises two circular plates 23 placed on top of each other and made from acetal plastic or fluorethylene plastic, for example. On their outer sides both these plates abut a pair of comparatively stiff metal plates 24, ensuring in this way that the piston 11 will have sufficient rigidity. In the plane of separation between both the plastic plates an annular groove 25 having a semi-circular cross section is provided, and a sealing element around the piston is mounted in this groove. The sealing element is a rigid annular supporting means, for example a smooth metal ring 26, rotatably arranged about which is a resilient casing 27, which may be made from rubber, for example.

The piston or sealing means 11, composed of the plastic plates 23 and metal plates 24, is movable along an engagement surface intended for it in the through-flow chamber 6 the housing 1, due to the normal variations in the water supply pressure prevailing in the valve and the spring pressure to which the valve spindle 7, 7' is subjected. This engagement surface is provided by at least a portion of the chamber 6 having a cylindrical wall surface 28, (FIG. 2 or 3) axially extended in the valve and arranged in an insert portion 29, screwable into the lower end of the housing and carrying inlet opening 2 with its associated connecting fitting 4.

The peripheral space between the piston 11 and the cylindrical engagement surface 28 in the housing 1 is filled and sealed by the sealing element 26, 27 mounted around the piston, lying in contact with the cylindrical surface 28. The resilient casing 27 rolls over this surface and also glides in the groove 25 in the plastic plates 23, which cause only minor friction in the piston 11.

In order to offer a through-flow passage in the valve, at least one section of the through-flow chamber 6 in the housing 1 is provided with an annular groove 30, having an effective cross sectional area in the housing greater than the cross sectional area enclosed by the cylindrical wall surface 28.

As shown in FIGS. 2 and 3, at the opening moment for the valve, the piston 11 passes the end of the cylindrical wall surface 28 and then reaches the region having the wider annular groove 30, a rapidly increasing annular space thereby occurring between the inner wall surface of the housing in the groove 30 and the piston 11, which at its set opening pressure is displaceable past the cylindrical surface 28 to open a through-flow passage in the valve.

To enable the valve to open fully as quickly as possible, the lower spindle portion 7 is provided with an annular impact surface 31 mounted above the piston 11, for the water flowing through the space between the piston and the housing wall, the water meeting this impact surface 31 and pressing it quickly up together with the 7, 7' and the piston 11 into the upper position, as illustrated by FIG. 3, where the valve is fully open and the water flowing through is deflected by the impact surface 31 and flows out through the outlet opening 3 as long as sufficient water pressure is available for the valve to keep open against the bias of the upper spring 14 against the spindle 7, 7' and therewith the piston 11.

It is thus the upper spring 14 which determines the opening pressure for the valve, and for this reason it should be as soft as possible. This spring should also be so heavily pretensioned that it is always operative to provide a bias.

On the other hand, the lower spring 13 is pretensioned so that it is only operative (i.e. compressed) until immediately before the valve opening moment. It will thereby be capable of helping the water pressure on the lower side of piston 11 to keep the piston floating for pressure variations less than the opening pressure, but greater than a particular minimum set pressure.

The embodiment of the valve according to the invention shown here is intended to open for a water pressure of 10 atmospheres in excess of atmosphere pressure (= 1080 × 10³ Pa) and to have the piston 11 floating for pressure variations between this value and 5 atmospheres in excess of atmospheric pressure (770 × 10³ Pa) which is then the equivalent of the bottom position of the piston. In the state shown in FIG. 1 the piston 11 is in a position corresponding to a pressure of approximately 7.5 atmospheres in excess of atmospheric pressure (840 × 10³ Pa), i.e. the piston is approximately half way between its bottom position and its opening position as shown in FIG. 2.

The invention is not limited to the example described above and on the drawing but can be modified in many different ways within the scope of the claims.

What I claim is:
1. A fluid pressure relief valve, comprising:
   a. a housing having an inlet opening leading to a through-flow chamber which communicates with an outlet opening, at least a part of said through-flow chamber being a valve seat in the form of a cylindrical wall surface;

b. a spindle slidably guided by said housing for movements in a direction parallel to the axis of said cylindrical wall surface;

c. a piston secured to said spindle for movements along the length of said cylindrical wall surface and having a peripheral seal normally forming a fluid seal therewith, said piston being movable therealong in response to normal variations in fluid inlet pressure, said piston being movable axially beyond said cylindrical valve seat in response to a predetermined excessive fluid inlet pressure to fluidly connect said inlet opening to said outlet opening, said peripheral seal comprising a rigid annular support core of metal, enclosed by a resilient sleeve casing rotatable thereon, whereby as said piston moves along said seat, said casing rolls along said cylindrical wall and rotates about its core;

d. a first preloaded spring acting between said housing and said spindle and biasing said piston in a direction away from said seat; and e. a second preloaded spring acting between said housing and said spindle and biasing said piston in a direction toward said seat with a greater force sufficient to override said first spring to maintain said fluid seal during said normal variations.

2. A valve according to claim 1 including a spring support carried on a threaded portion of said spindle, said first and second springs acting in opposite directions on said spring support, whereby when said threaded portion of the spindle is manually rotated, the magnitude of the preload of said springs is shifted in opposite directions.

3. A valve according to claim 2 in which said threaded portions of said spindle is rotatable with respect to another portion thereof to which said piston is secured.

* * * * *